United States Patent

Schnaubelt et al.

(10) Patent No.: US 6,895,911 B2
(45) Date of Patent: May 24, 2005

(54) METHOD FOR SIMULTANEOUSLY MOVING CAM SHAFTS OF VARIOUS CYLINDER BANKS PERTAINING TO AN INTERNAL COMBUSTION ENGINE

(75) Inventors: Michael Schnaubelt, Allendorff (DE); Matthias Schultalbers, Meinersen/Ahnsen (DE); Norbert Scheffer, Gilhorn (DE); Hans Gao, Wolfsburg (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 10/381,619

(22) PCT Filed: Aug. 28, 2001

(86) PCT No.: PCT/EP01/09896
§ 371 (c)(1),
(2), (4) Date: Mar. 27, 2003

(87) PCT Pub. No.: WO02/27156
PCT Pub. Date: Apr. 4, 2002

(65) Prior Publication Data
US 2004/0094105 A1 May 20, 2004

(30) Foreign Application Priority Data
Sep. 27, 2000 (DE) .......................................... 100 47 819

(51) Int. Cl.$^7$ .............................................. F01L 1/34
(52) U.S. Cl. ............................... 123/90.15; 123/90.16; 123/90.17; 123/90.31
(58) Field of Search .......................... 123/90.15, 90.16, 123/90.17, 90.18, 90.27, 90.31; 464/1, 2, 160

(56) References Cited

U.S. PATENT DOCUMENTS

| 5,245,968 | A | * | 9/1993 | Kolias et al. ................ 123/480 |
| 5,417,186 | A | * | 5/1995 | Elrod et al. .............. 123/90.17 |
| 5,462,022 | A | | 10/1995 | Ushida |
| 6,647,335 | B2 | * | 11/2003 | Jankovic et al. ............ 701/102 |

FOREIGN PATENT DOCUMENTS

| DE | 4402907 | 8/1995 |
| DE | 19832383 | 9/1999 |
| JP | 8270469 | 10/1996 |
| JP | 0196418 | 7/1998 |

* cited by examiner

Primary Examiner—Thomas Denion
Assistant Examiner—Ching Chang
(74) Attorney, Agent, or Firm—Ostrolenk, Faber, Gerb & Soffen, LLP

(57) ABSTRACT

A method for simultaneously adjusting camshafts of different cylinder banks of an internal combustion engine to a predetermined nominal angle relative to a crankshaft, where the camshafts actuate associated intake or exhaust valves of the corresponding cylinder banks of the internal combustion engine. The method includes the steps of: detecting a difference in adjusting speeds of associated actual angles of the camshafts, and changing over the time nominal angle of at least one of the camshafts with a higher adjusting speed until the actual angles of the camshafts have reached the original nominal angle. The nominal angle for the camshaft with the higher adjusting speed is changed over time so that a divergence between the actual angles of the camshaft with the higher adjusting speed and the actual angles of the camshaft with the lowest adjusting speed is first stopped and a then corresponding difference between these actual angles is reduced.

9 Claims, 3 Drawing Sheets

METHOD FOR SIMULTANEOUSLY MOVING CAM SHAFTS OF VARIOUS CYLINDER BANKS PERTAINING TO AN INTERNAL COMBUSTION ENGINE

PRIORITY CLAIM

This is a U.S. national stage of application No. PCT/EP01/09896, filed on Aug. 28, 2001. Priority is claimed on that application and on the following application:
Country: Germany, Application No.: 100 47 819.0, filed Sep. 27, 2000.

BACKGROUND OF THE INVENTION

The invention pertains to a method for simultaneously adjusting the camshafts of various cylinder banks of an internal combustion engine to predetermined nominal angles relative to the crankshaft, where the camshafts actuate the intake and exhaust valves of the associated cylinder banks of the internal combustion engine. The invention also pertains to an internal combustion engine with at least two banks of cylinders and a valve control system for each cylinder bank, each with at least one camshaft for the actuation of the exhaust and/or intake valves of the associated cylinder bank. In each case a camshaft adjuster can adjust the angle of at least one camshaft of a cylinder bank with respect to the crankshaft of the internal combustion engine. A control unit is provided which carries out the adjustment of the camshafts as a function of a predetermined nominal value.

In internal combustion engines with several banks of cylinders, such as the valve-controlled multi-row engine known from DE 198 32 383 A1, in which each row has its own set of camshafts, the angles of which are adjusted by a camshaft adjuster with respect to the crankshaft, a problem is observed at the low operating temperatures which can occur during, for example, a cold-start phase, namely, the problem that the camshafts of the different cylinder banks are adjusted at different speeds. This, however, leads to undesirable differences between the angles of one or more camshafts relative to the crankshaft and the angles of other camshafts relative to the crankshaft. For this reason, adjustment of the camshafts is not allowed until after the internal combustion engine has reached normal operating temperature.

A camshaft adjustment system is known from U.S. Pat. No. 5,462,022, in which a desired angle is automatically maintained between the camshaft and the crankshaft.

SUMMARY OF THE INVENTION

The present invention is based on the task of making available a method and an internal combustion engine of the type indicated above, where the camshafts of the different cylinder banks are adjusted synchronously, regardless of the temperature of the internal combustion engine.

For this purpose, it is provided in a method of the type indicated above that a difference in the speeds at which the actual angles of the camshafts in question are being adjusted is detected, and that the nominal angle of at least one of the camshafts which is being adjusted at a higher speed is changed over the course of time until the actual angles of the camshafts have reached the original nominal angle. The nominal angle of the camshaft with the higher adjusting speed is changed over time in such a way that the divergence between the actual angles of the camshaft with the higher adjusting speed and the actual angles of the camshaft with the lowest adjusting speed is first stopped and then the corresponding difference between these actual angles is reduced.

In addition, in the case of an internal combustion engine of the type indicated above, it is provided according to the invention that a control unit is designed in such a way that it detects a difference in the adjusting speeds of the camshaft adjusters and changes the nominal angle of at least one of the camshaft adjusters with the higher adjusting speed over the course of time until the camshaft adjusters have reached the original nominal angle. The nominal angle for the camshaft adjuster with the higher adjusting speed is changed over time in such a way that the divergence between the actual angles of the camshaft adjuster with the higher adjusting speed and the actual angles of the camshaft adjuster with the lowest adjusting speed is first stopped and then the corresponding difference between these actual angles is reduced.

This offers the advantage that the differences between the adjusting speeds of the camshafts which occur at low operating temperatures of the internal combustion engine are equalized. In other words, the camshafts are synchronized with each other. This prevents undesirable differences between the angles of the camshafts with respect to the crankshaft, which have negative effects in particular on the driving behavior of the internal combustion engine. As a result, it is possible to adjust the camshafts of internal combustion engines with several banks of cylinders even at low operating temperatures.

So that, independently of the difference between the adjusting speeds, the nominal angle can begin to be changed at the optimum time in all cases, i.e., at a time when the camshaft with the higher adjusting speed can be determined with sufficient reliability, the nominal angle of the camshaft with the higher adjusting speed is not changed until after a point has been reached at which a predetermined difference is present between the actual angle of the camshaft with the higher adjusting speed and the actual angle of the camshaft with the lowest adjusting speed.

To stop the divergence between the actual angles of the camshafts with different adjusting speeds, this nominal angle is first set at the beginning of the change of the nominal angle to the instantaneous actual angle of the camshaft with the higher adjusting speed as the beginning value. To prevent the actual angle of the camshaft with the higher adjusting speed from swinging beyond the changed nominal value, a prediction angle is added to the instantaneous actual angle, this prediction angle corresponding to the lag in the response of the actual angle of the camshaft with the higher adjusting speed after the first change is made to the nominal angle for this camshaft with the higher adjusting speed.

So that the actual angle of the camshaft with the higher adjusting speed returns in optimal fashion to the actual angle of the camshaft with the lowest adjusting speed, the absolute value of the changed nominal angle is calculated as the sum of the instantaneous actual angle of the camshaft with the slowest adjusting speed and a time-dependent function, the absolute value of which approaches a predetermined constant over the course of time. This time-dependent function is, for example, a PT1 function, its characteristics being determined at the beginning of the change in the nominal angle, preferably as a function of a temperature of the internal combustion engine and of a starting value of the changed nominal angle.

It is advisable for the nominal angle of the camshaft with the higher adjusting speed to be changed only after the temperature of the internal combustion engine is below a predetermined temperature.

BRIEF DESCRIPTION OF THE DRAWINGS

Additional features, advantages, and advantageous embodiments of the invention can be derived from the following description of the invention, which is based on the attached drawings.

DETAILED DESCRPTION OF THE PREFERRED EMBODIMENT

Figure 1:
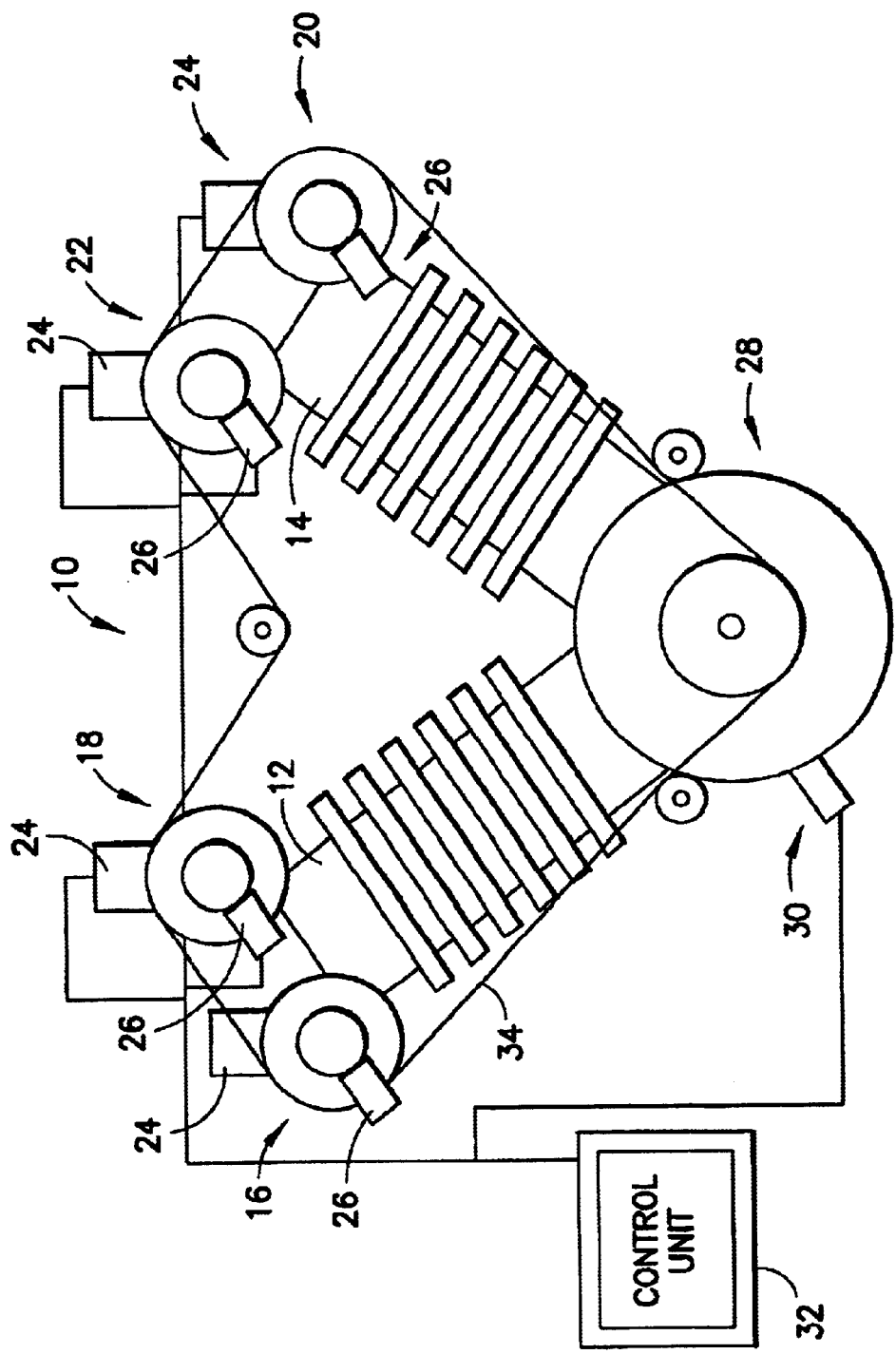
FIG. 1 shows a schematic diagram of a front view of a preferred embodiment of an internal combustion engine according to the invention.

The internal combustion engine 10 shown schematically in FIG. 1 comprises two banks of cylinders 12 and 14, an exhaust camshaft 16 and an intake camshaft 18 of the first cylinder bank 12, an exhaust camshaft 20 and an intake camshaft 22 of the second cylinder bank 14, associated camshaft adjusters 24, camshaft sensors 26, a crankshaft 28, and a crankshaft sensor 30. A control unit 32 receives signals from the sensors 26, 30 and supplies power to the camshaft adjusters 24 accordingly, so that a desired nominal value is obtained for the relative angle between the camshafts 16, 18, 20, 22 and the crankshaft 28. The camshafts 16, 18, 20, 22 are actuated by the crankshaft 28, acting by way of a drive system 34.

Figure 2:
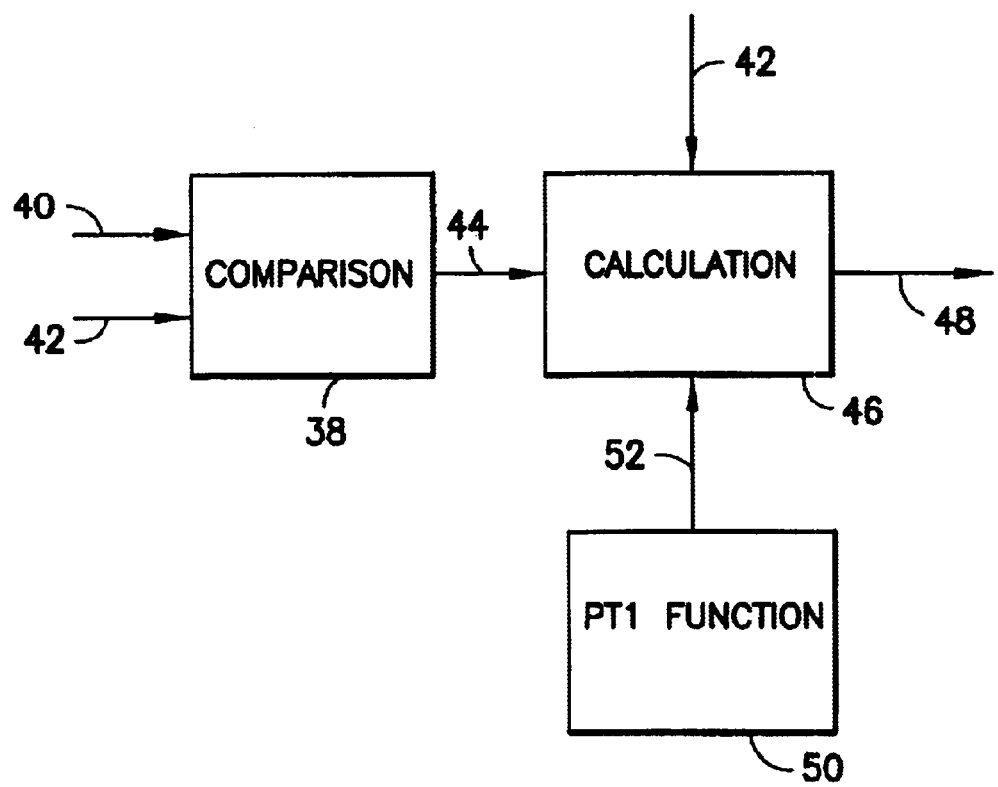
FIG. 2 shows a functional block diagram of a control unit, designed according to the invention, for the synchronized adjustment of the camshafts.

The invention provides for the synchronization of the camshafts 16, 18, 20, 22 of the various cylinder banks 12, 14. When, for example, the intake camshafts 18 and 22 of the two cylinder banks 12, 14 are to be adjusted simultaneously to a new nominal angle relative to the crankshaft 28, this is done hydraulically by means of the camshaft adjusters 24. Because the camshaft adjusters are actuated hydraulically, however, it can happen in certain operating situations that the speeds at which the instantaneous actual angles of the camshaft adjusters 24 and thus of the camshafts 18, 22 are being adjusted become different. This leads to a divergence between the instantaneous actual angles of the camshafts during the process of adjustment to the new nominal angle. In other words, it can occur that one of the camshaft adjusters adjusts more quickly than the other. Although the two camshafts 18, 22 ultimately arrive at the same nominal angle, one of the camshafts arrives at it more quickly than the other. The difference resulting during this period of time between the associated relative angles of the camshafts with respect to the crankshaft, however, has a negative effect on engine behavior and on the emissions of pollutants. According to the invention, a synchronization according to the following method is now proposed, which is explained on the basis of the functional block diagram of FIG. 2, which represents part of the control unit 32. The explanation is based by way of example on the intake camshafts 18 and 22, but it applies analogously to the exhaust camshafts 16, 20. In addition, the following description is based by way of example on two camshafts, one of which is adjusted more quickly than the other. It also applies, however, in analogous fashion to the simultaneous adjustment of three or more camshafts of three or more cylinder banks, in which case the following discussion is to be applied to each pairing of the camshaft with the lowest adjusting speed with each of the other camshafts with the higher adjusting speeds. In addition, the following explanation also pertains by way of example to a "positive jump" in the nominal angle, that is, the change in question involves an adjustment to a larger relative angle with respect to the crankshaft 28. The explanations apply in analogous fashion, however, to a "negative jump" as well, in which a smaller relative angle with respect to the crankshaft 28 is obtained, in which case the expressions "higher/above/larger" used to describe the relationships between the actual angles of the adjusted camshafts are to be changed to "lower/below/smaller".

In a block 38, the instantaneous actual angles 40, 42 of the two camshafts 18, 22 are received and compared with each other, and the associated adjusting speeds are determined. As soon as it is determined in block 38 that the two camshafts 18, 22 are operating asynchronously, an appropriate signal is sent at 44 to another block 46, and the instantaneous actual angle of the camshaft with the higher adjusting speed, to which a prediction angle has been added, is transmitted.

This prediction angle takes into account the lag in the response of the camshaft adjuster after a change is made to the nominal angle.

Figure 3:
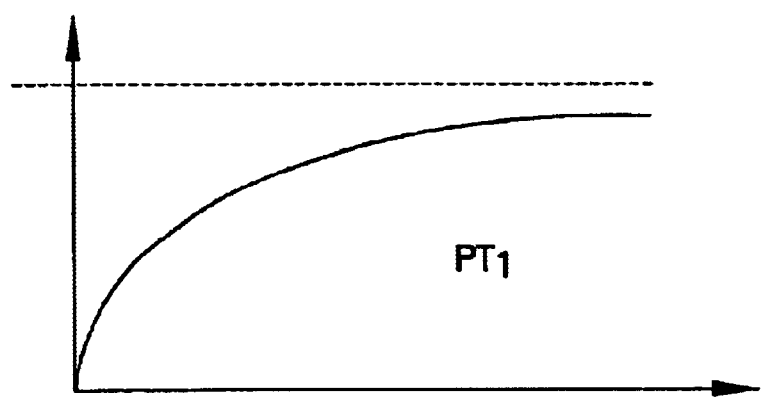
FIG. 3 shows a schematic diagram of a PT1 function.

In block 46, a nominal angle 48, which is changed over the course of time, is generated for the camshaft 18 with the higher adjusting speed. The changed nominal angle 48 is selected so that the instantaneous actual angle 40 of the camshaft 18 with the higher adjusting speed again approaches the instantaneous actual angle 42 of the camshaft 22 with the lowest adjusting speed, as will be explained later greater detail with reference to FIG. 4. So that it can determine the nominal angle 48, which is changed over the course of time, the block 46 also receives the instantaneous actual angle 42 of the camshaft 22 with the lowest adjusting speed. In addition, a PT1 function shown schematically in FIG. 3 is supplied from a block 50 via the connection 52. The changed nominal angle 48 for the camshaft 18 with the higher adjusting speed is calculated in block 46 by adding or subtracting an instantaneous value of the PT1 function to or from the actual angle 42 of the camshaft with the lowest adjusting speed. Whether the value of the PT1 function is added or subtracted depends only on whether the camshafts 18,22 are being adjusted to a larger relative angle (positive jump) or to a smaller relative angle (negative jump) with respect to the crankshaft. The characteristic values for the PT1 function are calculated at the beginning of the change in the nominal angle 48 for the camshaft 18 with the higher adjusting speed on the basis of the engine temperature and the difference between the actual angle 42 of the camshaft 22 with the lowest adjusting speed and the actual angle 40 of the camshaft 18 with the higher adjusting speed plus the prediction angle. The PT1 function varies over time, so that the changed nominal angle 48 for the camshaft 18 with the higher adjusting speed also varies. The drifting-apart or divergence of the actual angles of the camshafts 18, 22 to be adjusted is first stopped in order to achieve the best possible asymptotic approach of the actual angle 40 of the camshaft 18 with the higher adjusting speed to the actual angle 42 of the camshaft 22 with the lowest adjusting speed. The change in the nominal angle 48 for the camshaft 18 with the higher adjusting speed and thus the process of equalizing or synchronizing the actual angles 40 of the camshaft 18 with the higher adjusting speed with the actual angles 42 of the camshaft 22 with the lowest adjusting speed continues until the two camshafts 18, 22 have reached the original nominal angle, which is still valid for the camshaft 22 with the lowest adjusting speed. Only break-off conditions for plausibility reasons are provided. Thus, for example, the changing of the nominal angle 48 can be stopped and the original nominal angle restored if the instantaneous actual angle 42 of the camshaft 22 with the lowest adjusting speed increases in the direction of the original nominal angle and exceeds the changed nominal angle 48. What this means is that the camshaft originally identified as being the one being adjusted more slowly is now the camshaft with the higher adjusting speed. This can be explained by the occurrence of changes in the system parameters during the adjustment process or by a false identification at the beginning of the change to the nominal angle 48. An intrinsic property of hydraulic actuating systems is that they are subject to "sticking", which means that, at the beginning of the adjustment to the new nominal angle, the actual angles 40 of the camshaft 18 which is actually being adjusted more quickly remain below the actual angles 42 of the camshaft 22 which is actually being adjusted more slowly until the hydraulic force overcomes the sticking effect and the actual values 40 of the faster camshaft 18 finally overtake the actual angles 42 of the slower camshaft 22 in the direction toward the original nominal angle.

Figure 4:
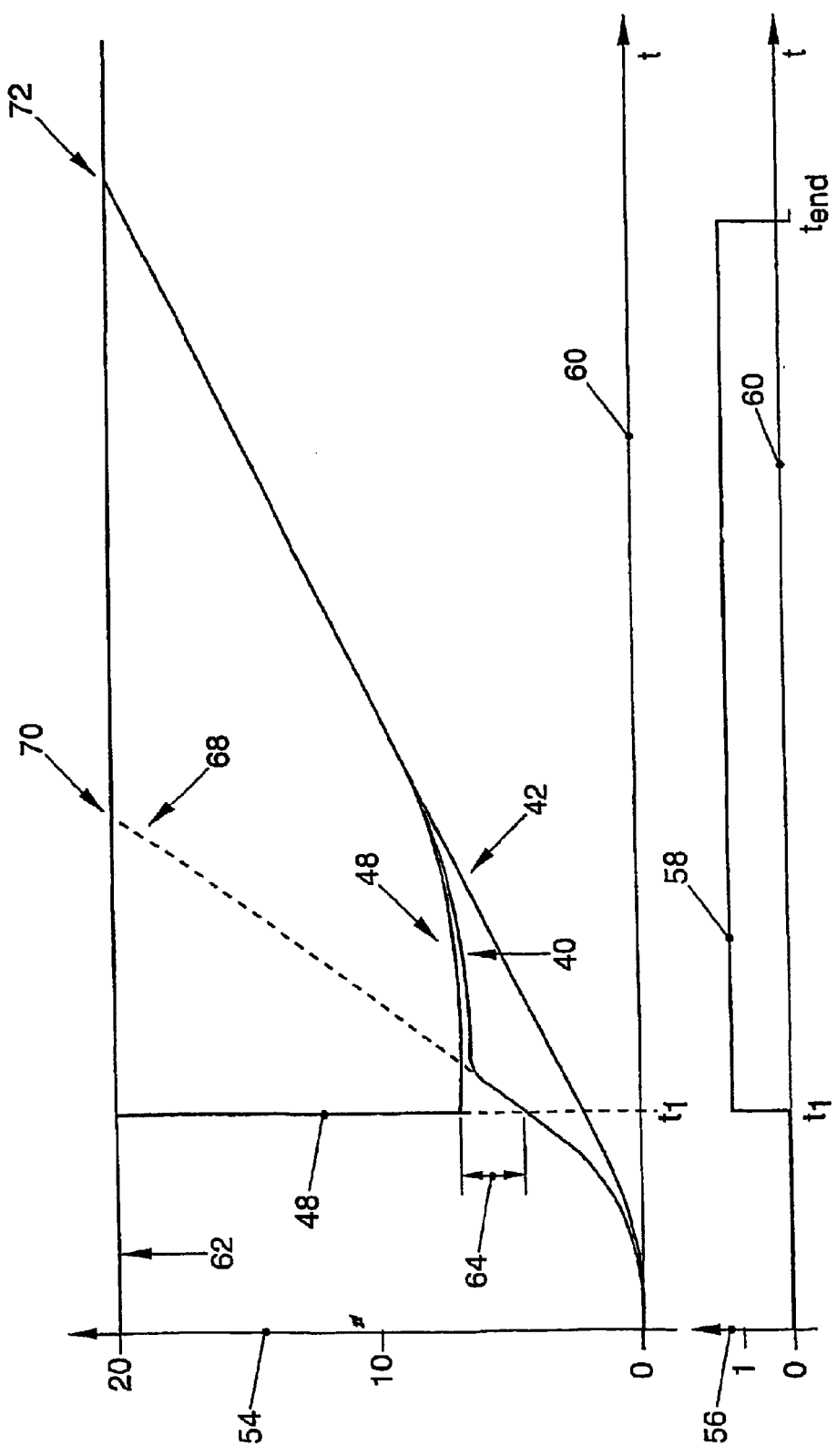
FIG. 4 shows a schematic diagram of the actual and nominal angles of the camshafts during an adjustment involving a positive jump in the relative angle between the crankshaft and the camshafts.

FIG. 4 illustrates graphically the change over time in the actual angles 40, 42 of the intake camshafts 18, 22 during the adjustment with simultaneous synchronization. The relative angle to the crankshaft is plotted in °CS on the vertical axis 54. A signal 58, which indicates the recognition of asynchronous operation (different adjusting speeds) of the camshafts 18, 22 to be adjusted is also shown on the vertical axis 56. The time t is plotted on the associated horizontal axis 60.

At time t=0, the relative angle of the camshafts 18, 22 with respect to the crankshaft is 0°CS, and a jump occurs to a new nominal angle 62 of 20°CS, which is referred to in the following as the "original nominal angle". This original nominal angle 62 applies initially to both camshafts 18, 22 or to their associated camshaft adjusters 24. Because, at low temperatures, such as during a cold-start phase, however, the camshaft 18 of the first cylinder bank 12 is being adjusted more quickly toward the original nominal angle 62 than the camshaft 22 of the second cylinder bank 16 or the camshaft adjuster, the actual angles 40, 42 of the two camshafts 18, 22 diverge from each other. The actual angles 40 of the faster camshaft 18 approach the original nominal angle 62 more quickly than the actual angles 42 of the slower camshaft 22. This remains so until time $t_1$. Here the difference between the actual angles 40, 42 has crossed a predetermined threshold, and an active synchronization of the two camshafts 18, 22 takes place. The faster camshaft 18 is braked.

For this purpose, the nominal angle 48 for the faster camshaft 18 is changed and shifted toward the starting angle present at the time t=0 (0°CS). In the case of the positive jump illustrated, the original nominal angle 62 is reduced to the changed nominal value 48 for the camshaft 18 with the higher adjusting speed, whereas, for the camshaft 22 with the lowest adjusting speed, the original nominal angle 62 continues to apply. The changed nominal angle 48 at time t1 is composed of the instantaneous actual angle 40 of the camshaft 18 with the higher adjusting speed plus a prediction angle 64, which takes into account the lag of the camshaft adjuster 24 of the camshaft 18 with the higher adjusting speed after the reduction of the nominal value 62 to the changed nominal value 48. This prevents the actual angle 40 of the faster camshaft 18 from oscillating around the changed nominal angle 48. The changed nominal angle 48 for the camshaft 18 with the higher adjusting speed is determined so that it is between the original nominal angle 62 and the actual angle 42 of the slower camshaft 22 at all times during the adjustment of the camshafts 18,22.

In the period between $t_1$ and $t_{end}$, as explained previously with reference to FIG. 2, the changed nominal angle 48 is now calculated with the use of the PT1 function and the actual angle 42 of the slower camshaft 22. This sum is then set as the changed nominal angle 48 if it is larger than the actual angle 40 of the faster camshaft 18 at the beginning of the synchronization at time $t_1$. As a result, the divergence between the actual angles 40, 42 is stopped, and the actual angle 40 then starts to approach the actual angle 42 again. In other words, the setting of different nominal angles 62, 48 for the asynchronously rotating camshafts 18 and 22 has the effect of synchronizing the camshafts 18 and 22, so that there is only a slight difference between the associated angles relative to the crankshaft 28. As FIG. 4 shows, the nominal angle 48 for the faster camshaft 18 is readjusted over the course of time for this purpose as required. This continuous readjustment ends at the time $t_{end}$, which is indicated by the resetting of the signal 58.

For comparison, the course of the actual angle 40 without synchronization according to the invention is plotted in broken line 68. The actual angle 40 of the camshaft 18 with the higher adjusting speed would in this case already have reached the original nominal angle 62 at 70, whereas the actual angle 42 of the camshaft 22 with the lowest adjusting speed would not reach the original nominal angle 62 until 72. Without synchronization, therefore, the relative angular positions of the camshafts 18 and 22 with respect to the crankshaft 28 drift apart considerably in an undesirable manner in the time between $t_1$ and $t_{end}$.

The time $t_1$ at which the change in the nominal angle 48 for the faster camshaft 18 begins is not a fixed value; on the contrary, it is variable, because the beginning of the synchronization process is determined by the difference between the actual angles 40, 42. This ensures that one of the camshafts is actually being adjusted more quickly than the other and that what is happening is not merely a series of small fluctuations in the adjusting speeds. The time $t_1$ can, for example, be 50 ms when there is a large difference in the adjusting speeds. If there is only a small difference between the adjusting speeds of the camshafts 18 and 22 to be adjusted, however, the time$_1$ could well be 200 ms.

What is claimed is:

1. A method for simultaneously adjusting camshafts of different cylinder banks of an internal combustion engine to a predetermined nominal angle relative to a crankshaft, where the camshafts actuate associated intake or exhaust valves of the corresponding cylinder banks of the internal combustion engine, the method comprising the steps of: detecting a difference in adjusting speeds of associated actual angles of the camshafts; and time the nominal angle of at least one of the camshafts with a higher adjusting speed being changed over time until the actual angles of the camshafts have reached the predetermined nominal angle, the nominal angle for the camshaft with the higher adjusting speed being changed over time so that a divergence between the actual angles of the camshaft with the higher adjusting speed and the actual angles of the camshaft with the lowest adjusting speed is first stopped and a then corresponding difference between these actual angles is reduced.

2. A method according to claim 1, wherein the nominal angle is not changed until after a point at which there is a predetermined difference between the actual angles of the camshaft with the higher adjusting speed and the actual angles of the camshaft with the lowest adjusting speed.

3. A method according to claim 1, including changing the nominal angle so that the absolute value of the difference between the actual angles of the camshafts and the changed nominal angle at a beginning of the adjustment is smaller than the difference between the actual angle of the camshafts and the original nominal angle at the beginning of the adjustment.

4. A method according to claim 1, including, at a beginning of the change in the nominal angle, setting a starting value of the nominal angle to an instantaneous actual value of the camshaft with the higher adjusting speed.

5. A method according to claim 4, further including adding a prediction angle to the instantaneous actual angle of the camshaft with the higher adjusting speed, which prediction angle corresponds to a lag in response of the actual angle of the camshaft with the higher adjusting speed after the first change has been made to the nominal angle for the camshaft with the higher adjusting speed.

6. A method according to claim 4, including calculating an absolute value of the changed nominal angle as a sum of the instantaneous actual angle of the camshaft with the lowest adjusting speed and a time-dependent function, the absolute value of which approaches a predetermined constant over time.

7. A method according to claim 6, wherein a PT1 function is used as the time-dependent function.

8. A method according to claim 7, wherein characteristics of the PT1 function are determined at the beginning of the change of the nominal angle as a function of the temperature of the internal combustion engine and of the starting value of the changed nominal angle.

9. An internal combustion engine, comprising: a crankshaft; at least two banks of cylinders; a valve control system for each cylinder bank, each valve control system including at least one camshaft operative to actuate at least one of intake and exhaust valves of the associated cylinder bank; a respective, adjuster operatively arranged at each camshaft so that an angle of at least one camshaft of a cylinder bank is adjustable relative to the crankshaft; and a control unit operative to control the adjustment of the camshafts as a function of a predetermined nominal angle, the control unit being operative to detect a difference between adjusting speeds of the camshaft adjusters and change the nominal angle of at least one camshaft adjuster with a higher adjusting speed over a course of time until the camshaft adjusters have reached the predetermined nominal angle, the nominal angle for the camshaft adjuster with the higher adjusting speed being changed over time so that the divergence between the actual angles of the camshaft adjuster with the higher adjusting speed and the actual angles of the camshaft adjuster with a lowest adjusting speed is first stopped and then a corresponding difference between these actual angles is reduced.

* * * * *